SPEAR PACKING APPARATUS

Original Filed Oct. 26. 1970 9 Sheets-Sheet 1

INVENTOR
BERNARD C. EISENBERG
by
Ostrolenk, Faber, Gerb & Soffen
ATTORNEYS

SPEAR PACKING APPARATUS

Original Filed Oct. 26. 1970 9 Sheets-Sheet 2

INVENTOR.
BERNARD C. EISENBERG
BY
Ostrolenk, Faber, Gerb & Soffen
ATTORNEYS

SPEAR PACKING APPARATUS

Original Filed Oct. 26, 1970 9 Sheets-Sheet 3

INVENTOR.
BERNARD C. EISENBERG
BY
Ostrolenk, Faber, Gerb & Soffen
ATTORNEYS

SPEAR PACKING APPARATUS

Original Filed Oct. 26, 1970 9 Sheets-Sheet 4

INVENTOR
BERNARD C. EISENBERG

BY

Ostrolenk, Faber, Gerb & Soffen

ATTORNEYS

SPEAR PACKING APPARATUS

Original Filed Oct. 26, 1970 9 Sheets-Sheet 6

INVENTOR.
BERNARD C. EISENBERG

BY
Ostrolenk, Faber, Gerb & Soffen

ATTORNEYS

SPEAR PACKING APPARATUS

Original Filed Oct. 26, 1970 9 Sheets-Sheet 7

INVENTOR.
BERNARD C. EISENBERG
BY
Ostrolenk, Faber, Gerb & Soffen
ATTORNEYS

SPEAR PACKING APPARATUS

Original Filed Oct. 26, 1970 9 Sheets-Sheet 8

INVENTOR.
BERNARD C. EISENBERG

BY

Ostrolenk, Faber, Gerb & Soffen

ATTORNEYS

SPEAR PACKING APPARATUS

Original Filed Oct. 26, 1970 9 Sheets-Sheet 9

INVENTOR.
BERNARD C. EISENBERG
BY
Ostrolenk, Faber, Gerb & Soffen
ATTORNEYS

United States Patent Office

Re. 27,852
Reissued Dec. 25, 1973

27,852

SPEAR PACKING APPARATUS

Bernard C. Eisenberg, Rockaway, N.J., assignor to Solbern Corp., Fairfield, N.J.

Original No. 3,662,518, dated May 6, 1972, Ser. No. 83,868, Oct. 26, 1970. Application for reissue Nov. 29, 1972, Ser. No. 310,390

Int. Cl. B65b *63/00*

U.S. Cl. 53—123 14 Claims

Matter enclosed in heavy brackets [ ] appears in the original patent but forms no part of this reissue specification; matter printed in italics indicates the additions made by reissue.

ABSTRACT OF THE DISCLOSURE

Apparatus for longitudinally segmentizing cucumbers and packing the segments in a jar with the seeded surfaces of the segments facing outward is constructed with means for receiving a whole cucumber and cutting same to predetermined length. The predetermined length of cucumber is slit longitudinally into spears of segmental cross section that are fed through individual twisted chutes and exit therefrom into a jar with the seeded surfaces of the segments facing outward. Guide means at the exit ends of the twisted chutes directs the segments outward toward the jar wall. Thereafter the guide means and the jar are angularly stepped so that additional spear segments entering the jar are directed between those segments previously placed in the jar.

In one embodiment of this invention, after the jar wall is lined with spear segments the guide means is withdrawn from the jar and additional spears are placed in the central region of the jar by hand.

In another embodiment of this invention, the guide means is selectively operated to a collapsed and an expanded condition. The jar wall is lined with spears while the guide means is expanded, and after the jar wall is lined with spear segments the guide means is collapsed and additional spear segments entering the jar remain at the central region to fill the jar without interfering with the spear segments lining the jar wall.

This invention relates to automatic packaging apparatus for inserting longitudinally segmentized spears into a glass container, with cut or seeded surfaces of the spears facing the side wall of the container.

Process pickles are prepared by packing clean cucumbers and appropriate chemicals in sealed containers and subjecting the packed sealed containers to heat for a sufficient period of time to kill bacteria and bring about the desired chemical reaction. Such pickles are usually packaged in jars either as whole cucumbers, as disc-like slices, or as spears formed by longitudinally slitting cucumbers into so-called segmentized spears. Marketwise, it is preferable to package segmentized spears so that the cut or seeded surfaces, rather than the skinned or uncut surfaces, face the side wall of the jar. In the prior art, for the most part, this type of packaging was performed entirely by a tedious hand operation which added significantly to the cost of the finished product.

Prior art apparatus to automatically pack segmentized spears with their seeded surfaces facing outward is disclosed in my U.S. Pat. No. 3,468,098 issued Sept. 23, 1969 for "Spear Packing Apparatus." Briefly, such patent discloses apparatus for pushing cucumbers, cut to predetermined length, through segmentizing knives and twisting chutes into a jar disposed at the exit end of the chutes. The mouth of the jar is smaller than the body thereof, and in order to direct the segmentized spears against the jar wall, the jar together with the pusher means, the knife means, and the twisted chutes are rotated to establish centrifugal forces acting on the segmented spears to drive them against the wall of the jar.

Operation of this type of apparatus has proven generally to be satisfactory. However, under some conditions there is a tendency for the segmental spears to skew, so that segmental spears previously placed in the jar interfere with segmental spears entering the jar thereafter. In addition, the provision of bearings and other mountings for the rotating parts and the provision of means for keying a downwardly moving pusher with rotating knives involves considerable expense. Thus, the apparatus of the instant invention is constructed so that there is no need to rely upon centrifugal forces for placement of the segmental spears.

Briefly, the apparatus of the instant invention includes the same knife means, twisted chutes, and pusher means as in my aforesaid U.S. Pat. No. 3,468,098. The knife means and twisted chutes are stationary, while the pusher means merely moves vertically and is not required to rotate. In one embodiment of this invention a guide means at the exit end of the twisted chutes is operable to an expanded or extended position for directing segmental spears outward the jar wall. The segmental spears produced from the first cucumber are not sufficient to cover the entire jar wall, so that the jar is stepped angularly to place unoccupied portions of the jar wall in position to receive segmental spears from the next cucumber. After a layer of spears covers the jar wall, the guide means is permitted to collapse so that additional segmental spears entering thereafter rest at the center of the jar.

In another embodiment of this invention, a non-collapsible guide means is utilized to direct segmental spears outward against the jar wall. This guide means is provided with pockets equal in number to twice the number of segments formed by each operation of the pusher means, and upon angular stepping of the guide means and jar appropriate guide means pockets guide the spears from the chutes to desired positions along the jar wall.

Accordingly, a primary object of the instant invention is to provide novel means for automatically packing segmental spears with the cut surfaces thereof facing outward.

Another object is to provide apparatus of this type having a plurality of pockets and means to angularly step the pockets so that selected ones thereof are used for guide purposes each time a cucumber is segmentized and the segments thereof placed in the jar.

Still another object is to provide apparatus of this type utilizing an expandable and collapsible guide for directing the segmental spears to predetermined positions in the jar.

Yet another object is to provide apparatus of this type in which the jar is stepped during the filling operation so that portions of the jar wall unoccupied by segmental spears are positioned to receive other segmental spears entering the jar.

A further object is to provide apparatus of this type in which the extendable and collapsible guide means is an umbrellalike structure.

A still further object is to provide apparatus of this type in which the expandable and collapsible guide means includes a fluid inflatable bladder.

These objects as well as other objects of this invention will become readily apparent after reading the following description of the accompanying drawings in which.

Figure 1:
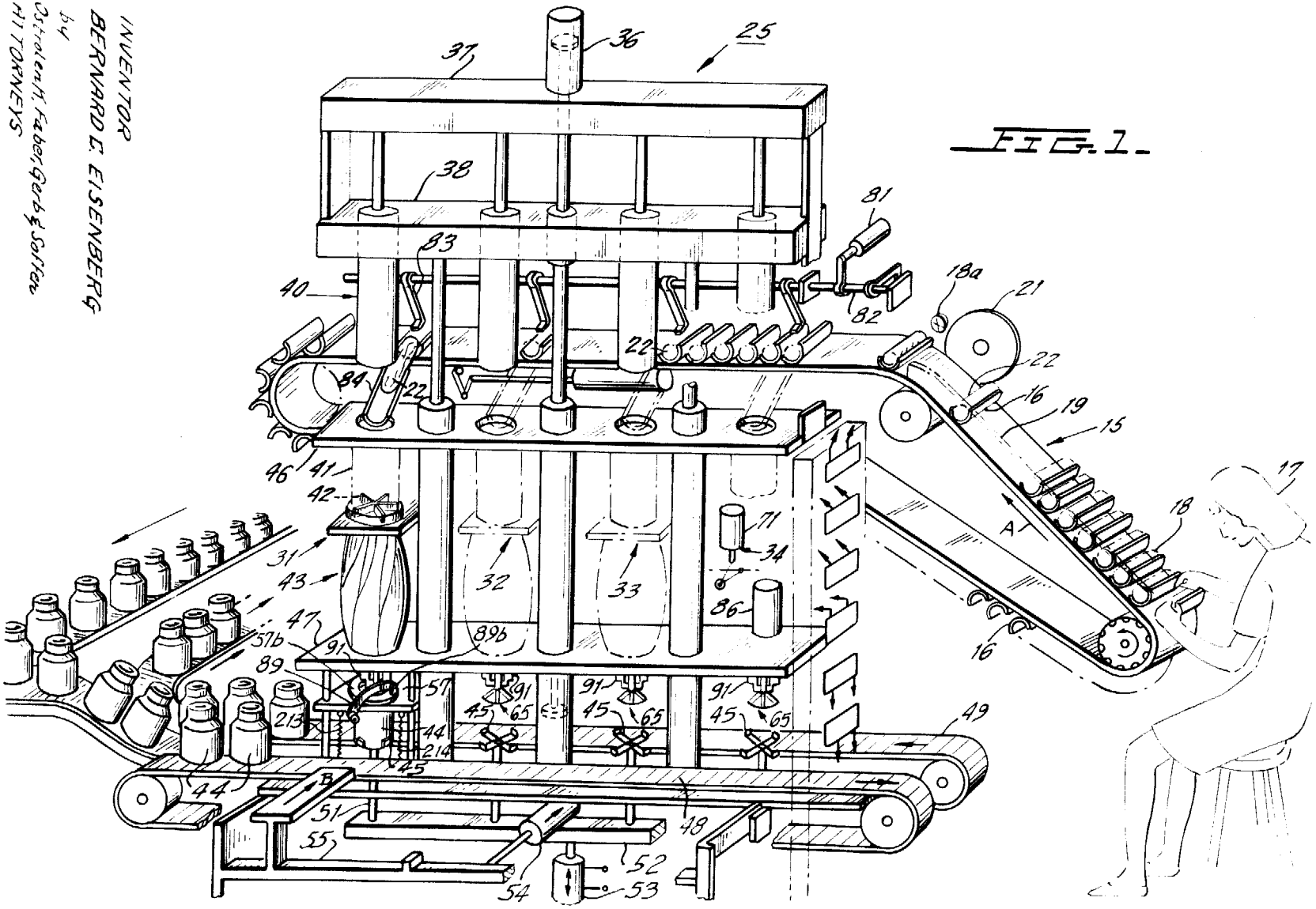
FIG. 1 is a perspective of a four-gang apparatus constructed in accordance with teachings of the instant invention.
Figure 2:
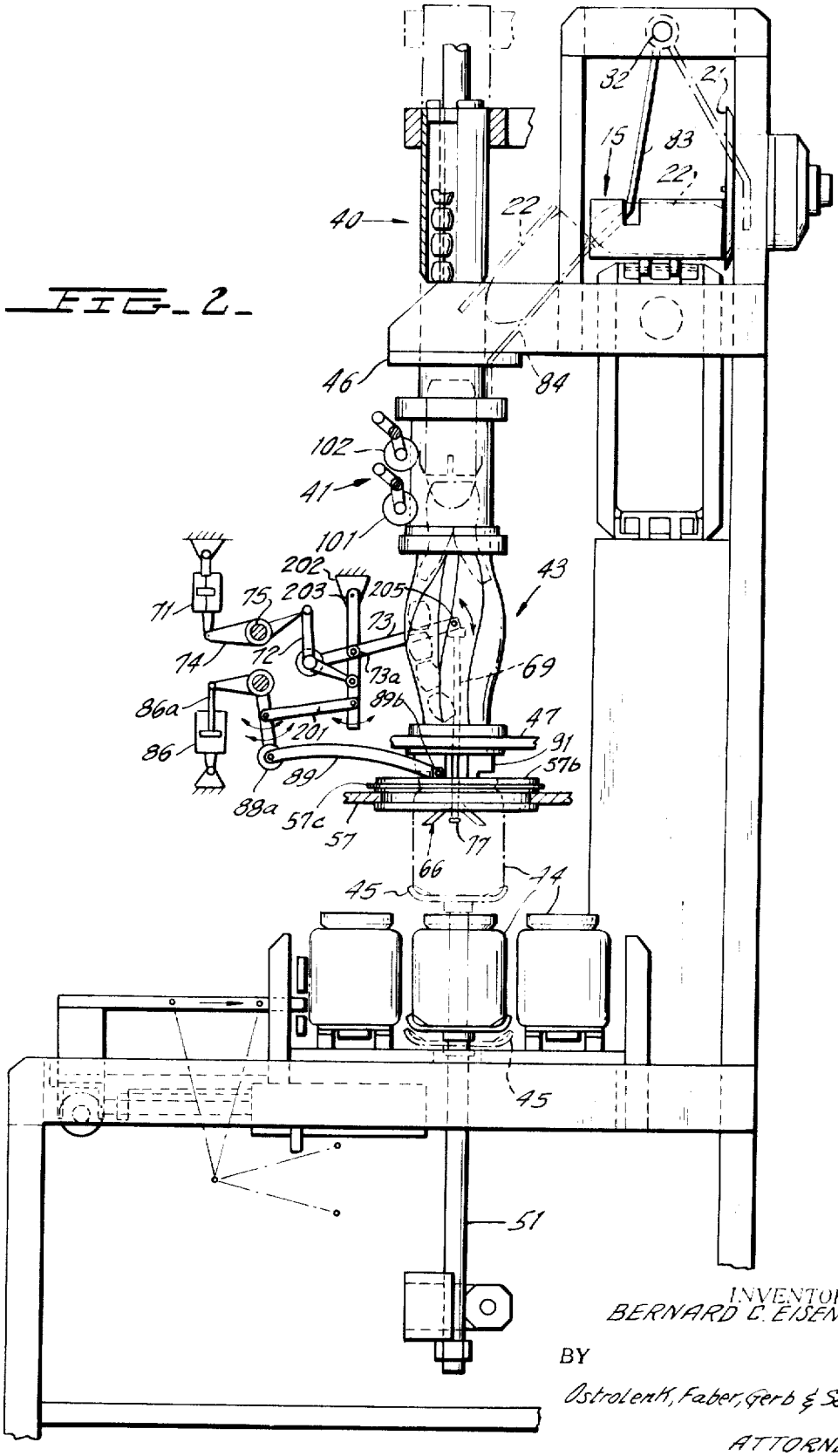
FIG. 2 is a side elevation of one section of the apparatus of FIG. 1.
Figure 3:
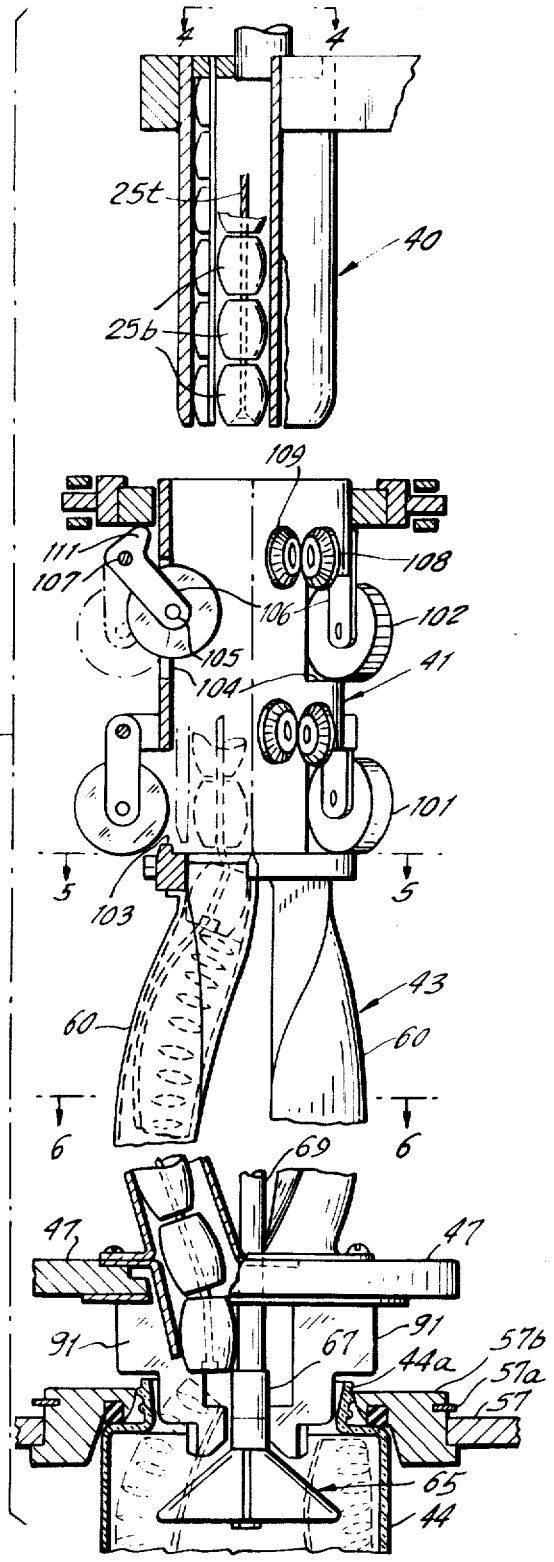
FIG. 3 is an enlarged view, partially sectioned, showing selected portions of the elements of FIG. 2.
Figure 4:
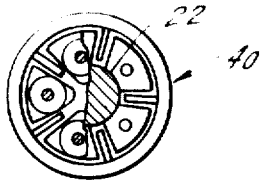
FIG. 4 is a plan view of the pusher means taken through line 4—4 of FIG. 3, looking in the direction of arrows 4—4.
Figure 5:
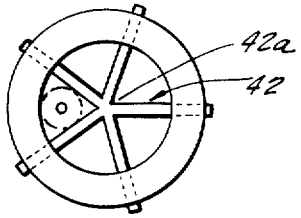
FIG. 5 is a plan view of the segmentizing knives looking in the direction of arrows 5—5 of FIG. 3.
Figure 6:
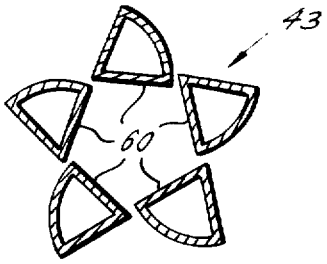
FIG. 6 is a hoizontal cross section taken through lines 6—6 of FIG. 3, looking in the direction of arrows 6—6, showing the cross section of the guide chutes at a point intermediate the end thereof.
Figure 7:
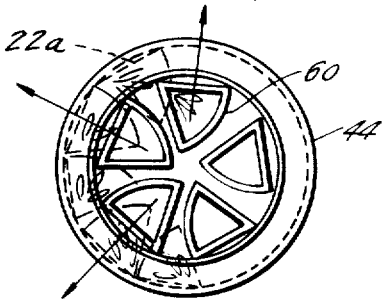
FIG. 7 is a plan view showing the exit end of the guide chute of FIG. 1 relative to a jar being filled.
Figure 8:
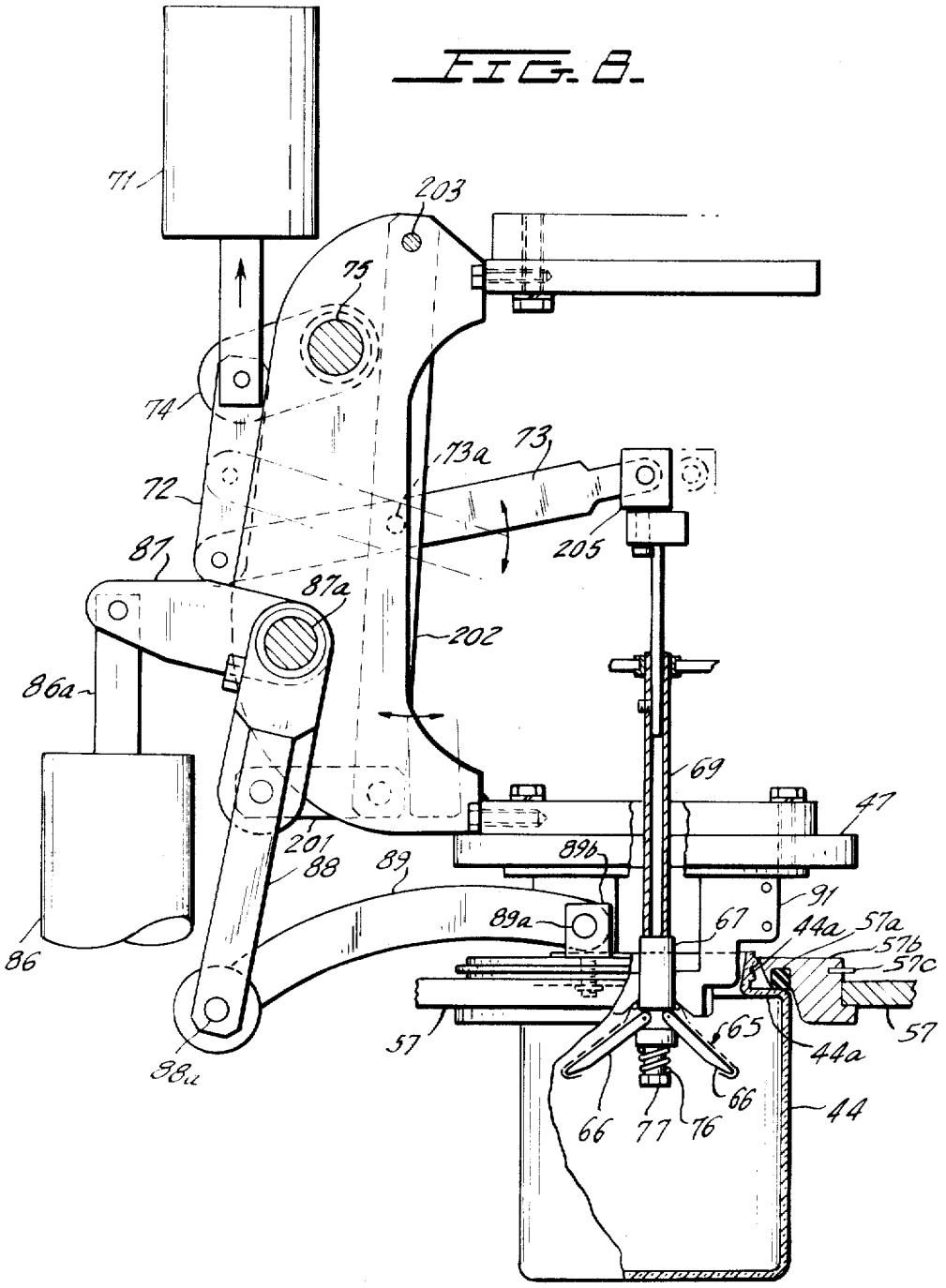
FIG. 8 is an enlarged view of the operating mechanism for the extendable or expandable guide that direct segmental spears in the jar.
Figure 8A:
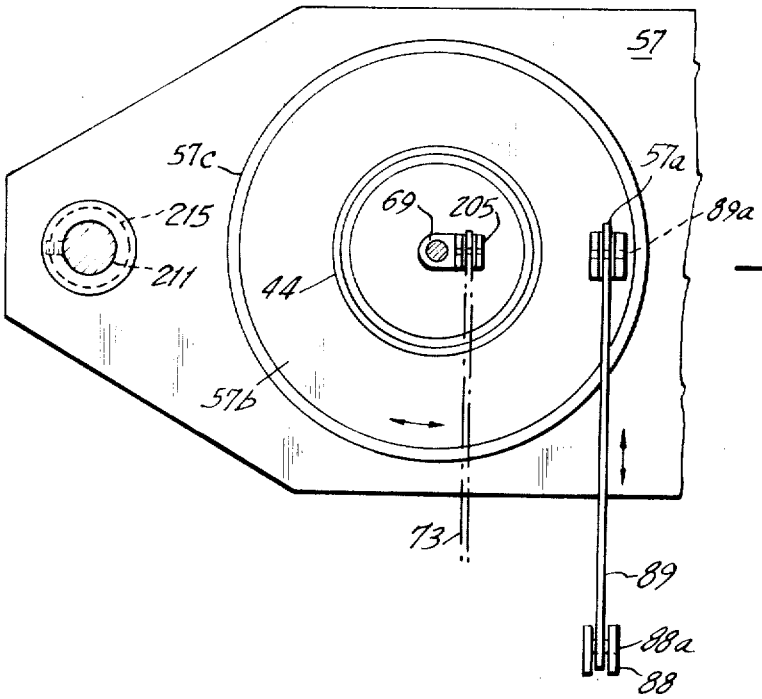

FIG. 8A as a vertical cross section taken through the center of a jar, looking in the direction of arrows 8A, 8A of FIG. 8, and showing the jar support and stripper elements.

Figure 8B:
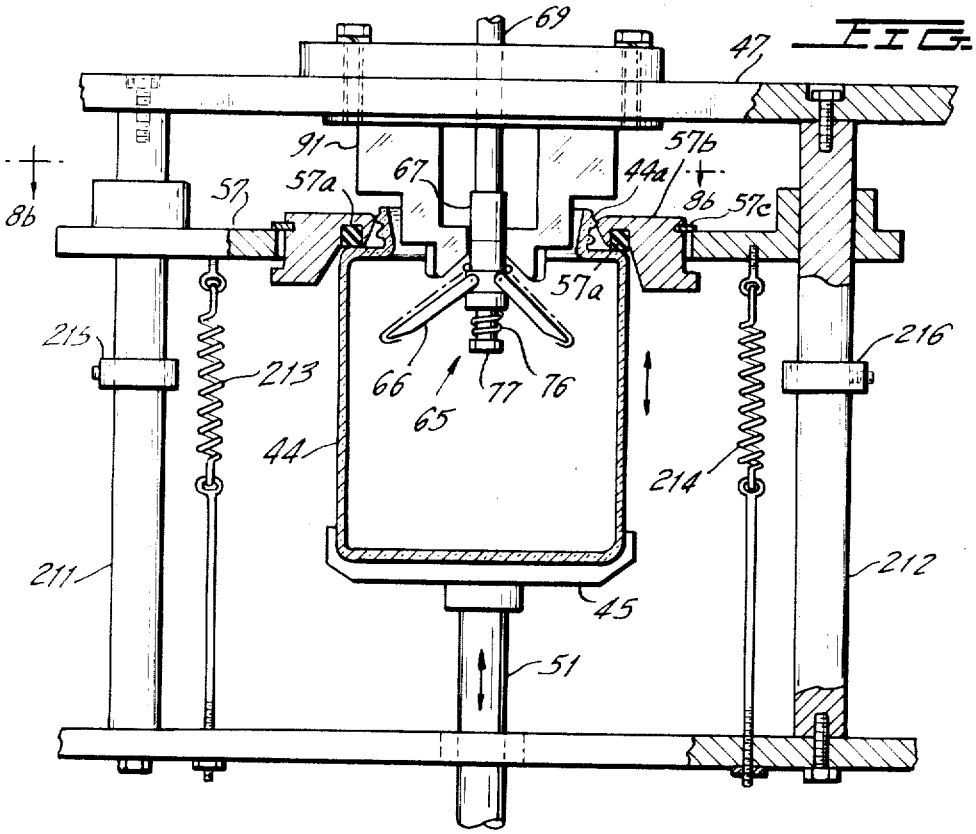

FIG. 8B is a plan view of the elements of FIG. 8A.

Figure 9A:
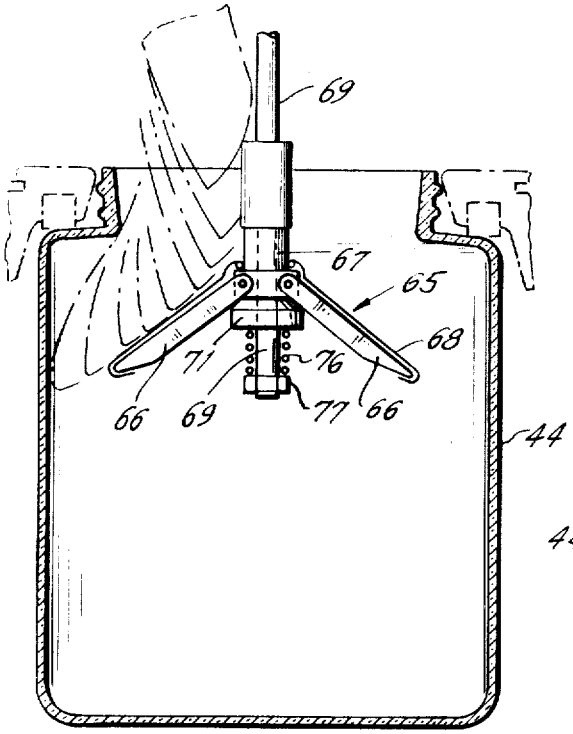
Figure 9B:
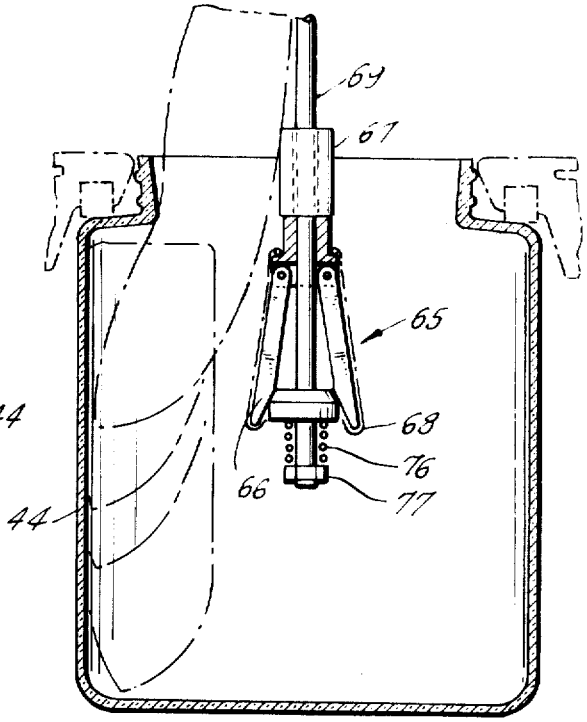

FIGS. 9A and 9B are side elevations showing operation of the extendable guide means in greater details than in FIG. 8. In FIG. 9A the guide means is extended, and in FIG. 9B the guide means is collapsed.

Figure 10:
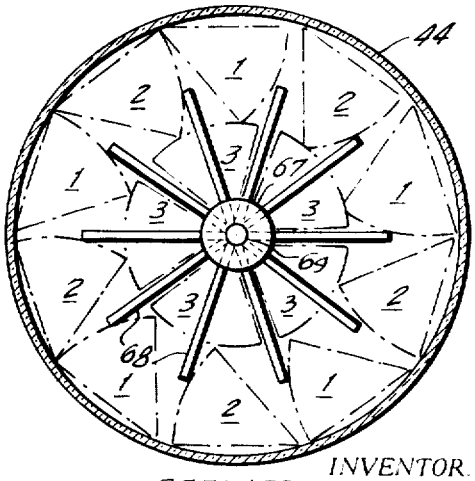

FIG. 10 is a plan view showing the relation between the guide means and the segmental spears, packed in a jar.

Figure 11:
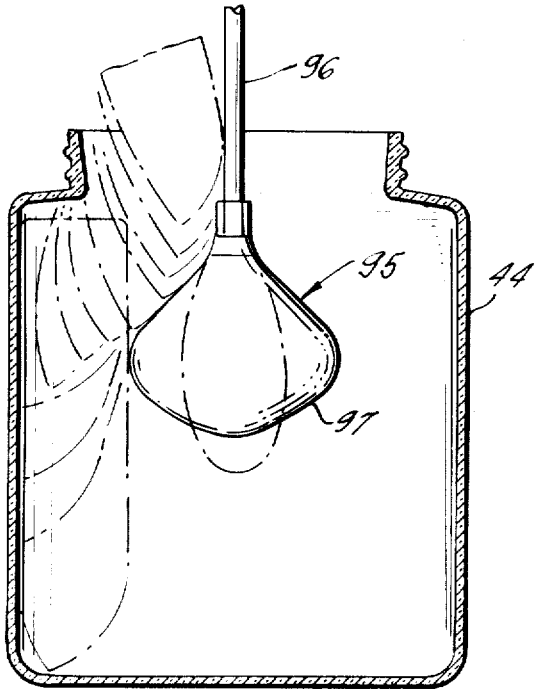

FIG. 11 is a side elevation illustrating another embodiment of the guide means, comprising an inflatable bladder.

Figure 12:
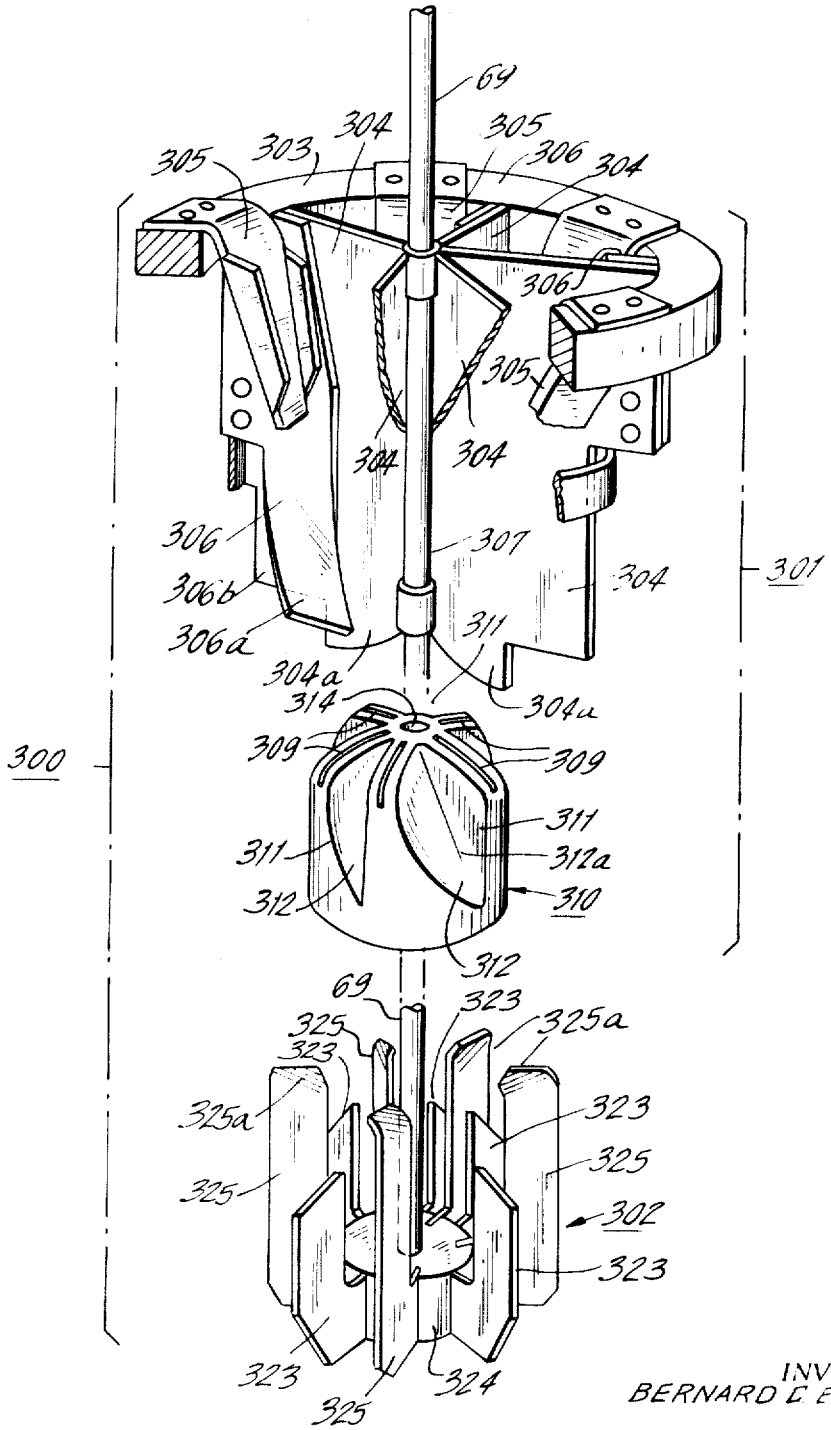

FIG. 12 is an exploded perspective, illustrating a further embodiment of the guide means.

Figure 13:
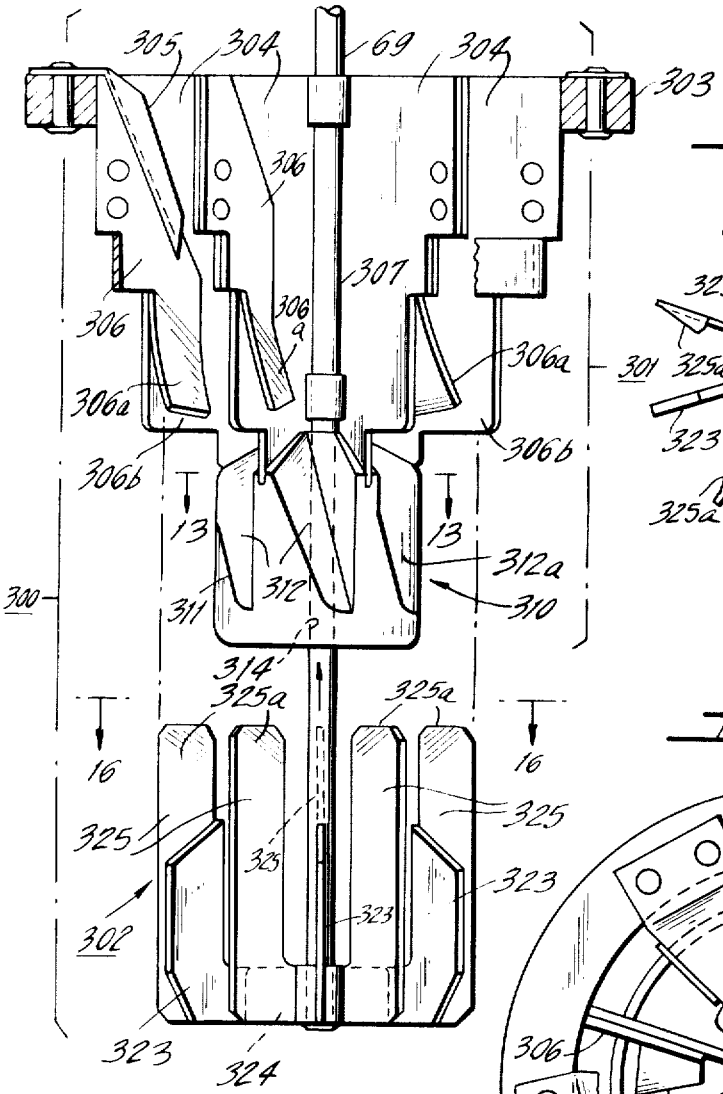

FIG. 13 is a side elevation of the elements of FIG. *12* [11].

Figure 16:
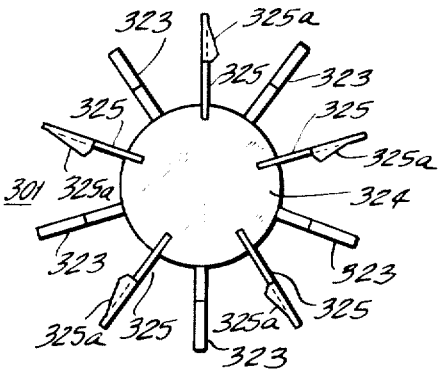
Figure 14:
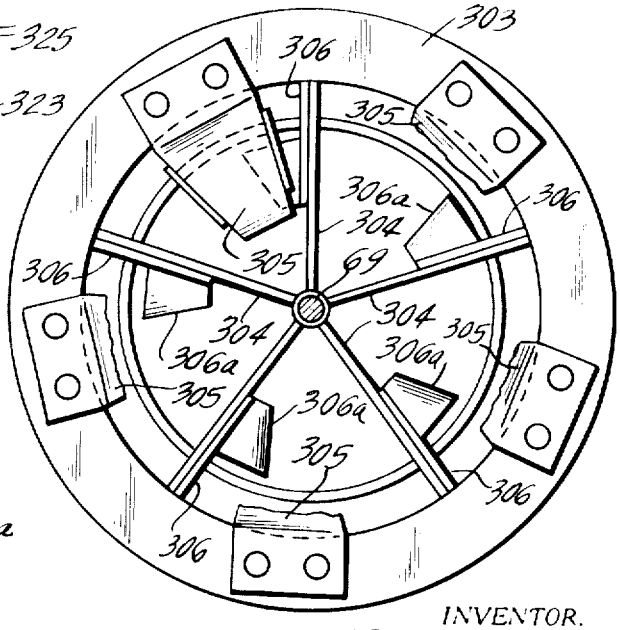
Figure 15:
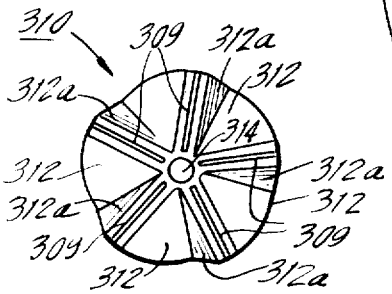

FIGS. 14, 15 and 16 are plan views of the elements of FIG. *13* [12] looking in the direction of the respective arrows 14, 14, 15, 15 and 16, 16.

Figure 17:
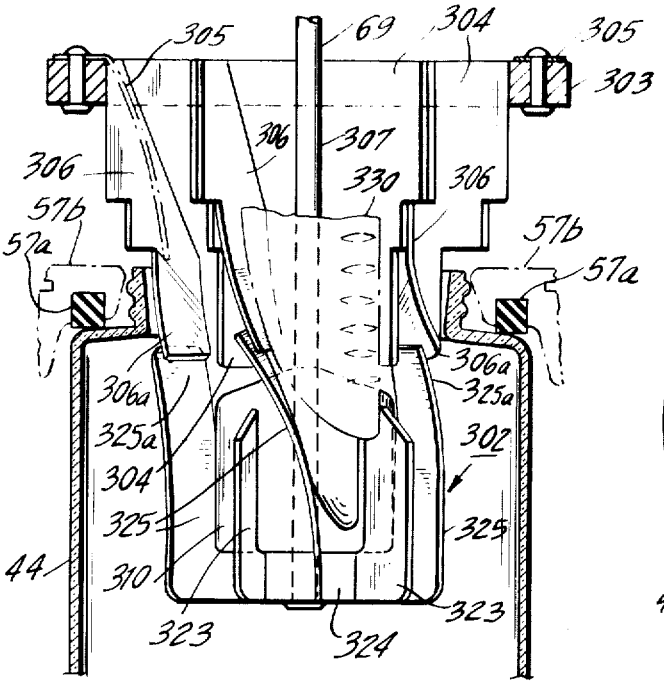

FIG. 17 is a fragmentary side elevation illustrating the manner in which a spear is guided into place in the jar during the first down stroke of the pusher means.

Figure 17A:
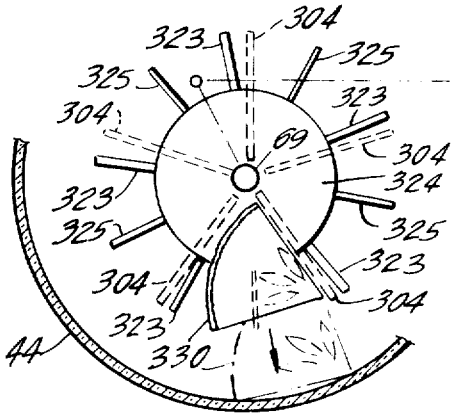

FIG. 17A is a fragmentary plan view of the elements of FIG. 17.

Figure 18:
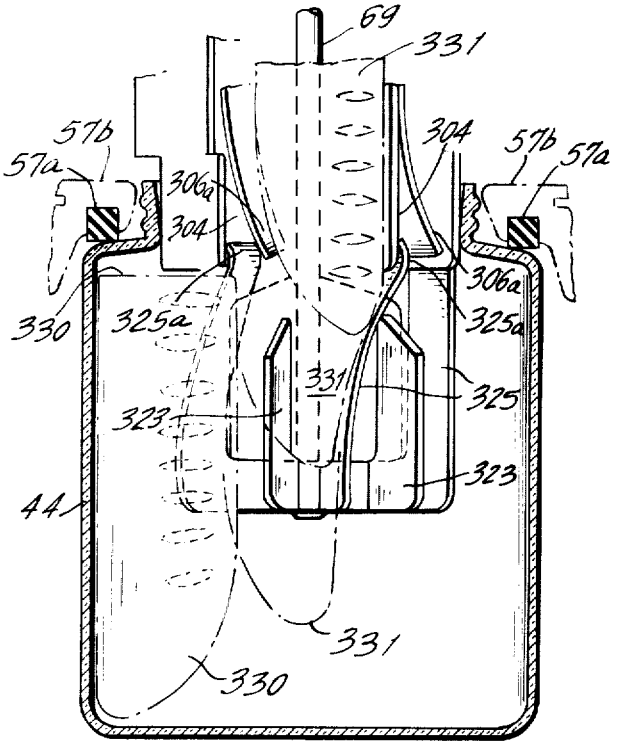

FIG. 18 is a fragmentary side elevation, showing the elements of FIG. 17, repositioned to guide a spear into place in the jar during the second down stroke of the pusher means.

Figure 18A:
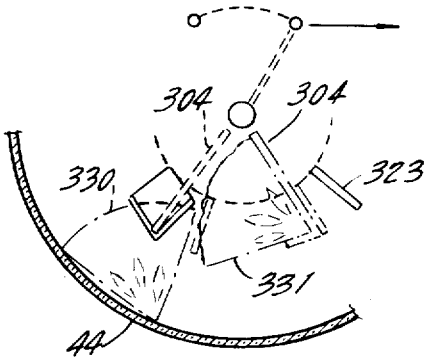

FIG. 18A is a fragmentary plan view of the elements of FIG. 18.

Now referring to the figures, and more particularly to the embodiment of FIGS. 1–10. Automatic filling apparatus of the instant invention includes product feed conveyor 15 having a plurality of transversely extending pockets 16 into which operator 17 inserts whole cucumbers 18, forcing the left end thereof against barrier 19 which extends along the upwardly inclined loading flight for conveyor 15. The right ends of cucumbers 18 extend beyond the right end of each pocket 16, and as conveyor 15 moves in the direction of arrow A past rotating slitter blade 21, the excess length tip 18a is removed to produce spears 22 of predetermined length that are delivered to four-gang packet 25.

Packer 25 consists of four essentially identical units 31–34, mechanically tied together for simultaneous operation. Apparatus 25 is constructed with four packing units, since a single operator 17 may conveniently fill pockets 16 fast enough to satisfy a four-gang unit. Since each of the packing units 31–34 is substantially identical, hereinafter for the most part only the construction of packing unit 31 will be referred to. Apparatus 25 includes double acting cylinder 36 mounted to member 37 for operating horizontal tie bar 38 up and down.

Pusher means 40, including five assemblies of metal thread 25t and a plurality of plastic bead-like elements 25b, is mounted to tie bar 38 for movement thereby. Downward movement of tie bar 38 drives the lower end of pusher means 40 into hopper 41 through the upper end thereof, and in so doing drives spear 22 in hopper 41 through segmentizing knives 42 (FIG. 5) at the bottom of hopper 41, and drives the segmental spears 22a formed by knives 42 through the array of five twisted chutes 43 into jar 44 supported on platform 45. Hopper 41 and twisted chute array 43 are fixedly connected end to end, and the combination of hopper 41 and array 43 extend between stationary frame members 46, 47 and are fixedly secured thereto.

Each spear 22 is centered in hopper 41 by two sets of rollers 101, 102, which project through openings 103, 104 respectively, in the sides of hopper 41 to engage the sides of spear 22. The five hollers 102 of the upper set are freely mounted on pin 105 to the lower end of bifurcated crank 106 between the arms thereof. A midportion of crank 106 is pivoted at pins 107 to outboard extensions of hopper 41. The ends of pins 107 are keyed to bevel gears 108, 109, which engage bevel gears keyed to pivot pins adjacent cranks 106. Torison springs (not shown) mounted on pins 107 bias rollers 102 inward.

Each crank 106 is provided with upwardly extending nose 111 engageable by means (not shown) when plunger or pusher 40 is raised, to move rollers 102 radially away from the center of hopper 41. The interconnection of all rollers 102 by gears 108, 109 assures that wheels 102 are always equally spaced from the axis extending through the center 42a of knives 42. Mountings and interconnections for lower wheels 101 are identical to these elements for wheels 102. However, the cranks for lower wheels 101 are not provided with extensions similar to 111, so that lower wheels 101 are always forced radially inward.

Empty jars 44 arrive at apparatus 25 on input conveyor 48, and after filling thereof jars 44 are taken away on take-off converyor 49. In particular, support 45, pivotally mounted to the upper end of rod 51 extending upward from tie bar 52, is operated vertically by double acting cylinder 53. With support 45 operated to its lowered position by cylinder 53, operation of double acting cylinder 54 to drive extension 56 of tie bar 55 in the direction of arrow B moves an empty jar 44 from input conveyor 48 on to support 45, and in so doing the empty jar 44 pushes a full jar from support 45 and delivers the full jar to take-off conveyor 49. Thereafter cylinder 53 is operated to raise support 45, so that the upper part of jar 44 fits firmly against resilient collar 57a secured to ring 57b located at the exit end of twisted chute array 43.

For a reason to be explained hereinafter, ring 57b is locked to plate 57 by snap ring 57c (FIGS. 8–8B), so that ring 57b is pivotable in the plane thereof. Plate 57 is slidably mounted on vertical rods 211, 212, which extend between frame members 47 and 147. Tension springs 213, 214 engage plate 57 from below, biasing the latter downward to maintain a good seal between jar 44 and resilient collar 57a. Adjustable stops 215, 216 on the respective posts 211, 212 limit downward movement of plate 57, so that with support 45 in its lowermost position the upper edge of jar 44 is below ring 57b.

The individual chutes 60 of array 43 are twisted from one end to the other, so that each segmental spear 22a is rotated to a position where a cut or seeded surface thereof faces outward as spears 22a leave chute array 43. It is desired that the segmental spears 22a forming the outer layer of material within jar 44 will remain in this position. Thus, extendable guide means 65 is provided at the lower end of twisted chute array 43.

Guide means 65 (FIGS. 9A and 9B) is an umbrella-like structure, which extends into jar 44 when jar support platform 45 is in its raised position. Guide means 65 includes a plurality of ribs 66 hinged to collar 67 and extending outwardly therefrom. Flexible sheet member 68 is connected to the plurality of ribs 66 to provide a generally conical guide surface when ribs 66 are operated to their extended positions of FIG. 9A. Operating rod 69 is axially movable through a central bore in collar 67. Cam 71, slidably mounted to rod 69 near the lower end thereof, is engageable with ribs 69 to extend the latter when rod 69 is in its raised position of FIG. 9A. Rod 69 is raised and lowered by double acting cylinder 71 (FIG. 8), driving through link 72, and crank 73, with movement of link 72 being guided by link 74 pivoted on stationary shaft 75. With guide means 65 in its extended or expanded position of FIG. 9A, as segmented spears 22a enter jar 44 the lower ends thereof are deflected radially outward or toward the inner surface of jar 44. The edge of the guide surface formed by sheet member 68 remains firmly in engagement with segmental spears 22a through the yielding action of coiled compression spring 76 wound about the lower end or rod 69 and interposed between cam 71 and nut 77.

As best seen in FIG. 10, the side wall of jar 44 is extensive enough to accommodate ten segmental spears 22a, yet only five such spears 22a are formed each time pusher assembly 40 moves through a down stroke. Thus, starting with empty jar 44, on the first down stroke of plunger assembly 40 there will be spaces between those segmental spears 22a that are placed in jar 44. To position these spaces to receive the next group of segmental spears 22a inserted in jar 44, prior to the next down stroke of plunger 40, double acting cylinder 86 (FIG. 8) is actuated to step resilient collar 57a and guide means 65 angularly through 180° divided by the number of chutes in array 43. Thus, in the construction illustrated, collar 57a and guide means 63 are pivoted through a 36° step. Jar 44, being on raised platform 45 in firm frictional engagement with collar 57a, also pivots in a 36° step.

More particularly, when operating rod 86a of cylinder 86 is retracted from the position of FIG. 8, rod 86a acts through crank 87, 88 centrally pivoted at 87a, and link 89 to pivot plate 57b and resilient collar 57a secured thereto. Link 89 is connected at pin 88a to the end of crank 87, 88 remote from cylinder 86, and is connected at pin 89a and clevis 89b to collar bearing plate 57b. Movement of link 89, being in a vertical plane that does not pass through the center of plate 57b, causes pivoting of collar 57a and jar 44, in frictional engagement with collar 57a.

Connecting rod 201 joints the lower end of link 202 to crank 87, 88 and pin 203 pivotally mounts link 202 at its upper end. Links 73, 202 are pivotally connected at their centers by pin 73a and extend generally at right angles to one another. Thus, when the bottom end of rod 202 moves through the operation of cylinder 86, link 73 moves generally parallel to the length thereof and acts through crank connection 205 at the upper end of rod 69 to pivot the latter, thereby pivoting guide means 65.

After a substantially complete layer of segmental spears 22a is formed against the wall of jar 44, guide means operating rod 69 is moved downward to the position shown in FIG. 9B. This permits guide means 65 to collapse as the next group of segmental spears 22a is forced into jar 44, so that this last group of spears 22a remains at the center of jar 44 and does not interfere with the segmental spears 22a lining the wall of jar 44.

While jar support 45 is being lowered through the operation of cylinder 53, springs 213, 214 pull plate 57 downward against stops 215, 216 and after plate 57 ceases to move, filled jar 44 continues to move downward to a point below ring 57b, with the weight of loaded jar 44 being sufficient to separate jar 44 from collar 57a.

Operation of apparatus 25 consists of the following operations:

(1) Jar support 45 is lowered by cylinder 53, and cylinder 54 is actuated so that pusher 56 delivers an empty jar 44 to support 45 and in so doing such empty jar 44 pushes or delivers a full jar from support 45 to take-off conveyor 59. Thereafter, support 45 is raised to raise plate 57 and plae an empty jar 44 in position adjacent the bottom of twisted chute assembly 43, with diverter plate array and guide means support 91 extending into the upper end of jar 44.

(2) Adjacent packing units 31–34 being spaced apart by five times the center-to-center distance of adjacent pockets 16, conveyor 15 is then stepped by a distance equal to four times the space between adjacent pockets 16, and plunger assembly 40 is raised.

(3) Segmental spears 22a are ejected from selective pockets 16 by operating power cylinder 81 to pivot shaft 82 and operate arm 83 to sweep through selected pocket 16 and remove spears 22a therefrom. These removed spears 22a are guided by slides 84 into hopper 41 at the upper end thereof.

(4) Guide means 65 is expanded by operating cylinder 71.

(5) Plunger assembly 40 is lowered to drive a group of five segmental spears 22a into jar 44, and then assembly 40 is moved upward and withdrawn from hopper 41.

(6) Cylinder 86 is operated to angularly step jar 44 and expanded guide 65 through an angle of 36°.

(7) Steps 2, 3 and 5 above are repeated in sequence.

(8) Cylinder 71 is operated to collapse guide means 65, as in FIG. 9B, and steps 2, 3 and 5 above are repeated in sequence.

(9) Cylinder 86 is operated to restore jar support 45 to its angular position of steps 1–5 above, and steps 1–5 above are repeated in sequence.

(10) Steps 6, 7 and 8 above are repeated in sequence.

(11) Steps 9 and 10 above are repeated in sequence over and over again.

In the embodiment of FIG. 11, guide means 95 consists of inflatable bladder 97 of plastic or rubber material reinforced with fabric so that bladder 97 assumes a predetermined shape when inflated. Hollow tube 96 connected to the top of bladder 97 provides a conduit through which pressurized fluid enters and leaves bladder 97 for actuation and decatuation thereof.

The embodiment of the guide means illustrated in FIGS. 12–18A is intended for operation in which the spears are automatically placed in a single layer against the jar wall, and additional spears are placed inside of this layer, manually, in random fashion. In particular, guide means 300 of FIGS. 10–18A comprises stationary section 301 and movable section 302. The latter is pivotally mounted for angular to-and-fro stepping by the same means that operates link 89 to pivot jar 44.

Stationary section 301 includes mounting ring 305 fixedly secured to stationary frame member 47 in position with the spaces between fins 304 extending radially inward from ring 303 to tubular hub 307 through which rod 69 extends. Each fin 304 is positioned in alignment with the chute sides at the exit openings of twisted chutes 60. Five spring deflectors 305 secured to ring 303 and equally spaced thereabout extend into the spaces between fins 304 for a reason to be hereinafter explained. An individual sheet metal element 306, secured to each of the fins 304, is flared at its lower end 306a away from its associated fin 304 to form space 306b, for a reason to be hereinafter explained.

The lower ends 304a of fins 304 are entered into tightly fitting radial slots 309 in the upper surface of nylon block 310 to frictionally retain block 310 in operative engagement with fins 304. Block 310 is provided with five vertical notches 311, each having slanting surface 312, which, as will hereinafter be explained, deflects a spear outwardly toward the inner wall of the jar. Operating rod 69 also extends through central bore 314 of block 310 aligned with tube 307.

Movable section 302 is secured to the lower end of rod 69, so as to be pivoted thereby. Section 302 includes five circularly arranged vertically extending rigid fingers 323, secured to the outer surface of short cylindrical block 324 and extending upwardly along the side of block 310. Also secured to block 324 are five resilient fingers 325, which extend upwardly along the side of block 310 and above the upper ends of fingers 323. Each resilient finger 325 is located in the space between two adjacent rigid fingers 323, and is spaced midway between them.

Upper end 325a of finger 325 is deflected in the direction in which section 302 will pivot prior to the second stroke of the pusher means when providing spears for the same jar. Upper end 325a of finger 325 extends into space 306b so as to engage fins 304 and members 306 and be deflected thereby to the positions illustrated in FIGS. 15 and 16. More particularly, during the first downward stroke of pusher means 40, guide means section 302 occupies the position shown in FIG 15, with the upper end 325a of resilient finger 325 being deflected to the left with respect to the bottom end thereof, which is fixedly secured to block 324. In this position of movable section 302, the pocket formed between spring finger 325 and rigid finger 323 immediately to the right thereof is positioned to receive and guide segmental spear 330 as it moves through a pocket 311 in block 310, being deflected outwardly by block surface 312 and being deflected circularly toward block surface 312a by spring 305.

When the lower end of spear 330 reaches the bottom of jar 44, movable section 302 and jar 44 are angularly stepped in a clockwise direction with respect to FIG. 17A to the position of FIG. 18A. In this latter position, upper end 325a of spring finger 325 engages fin 304, to be deflected to the right with respect to the lower end of finger 325. On the next downstroke of pusher means 40, spear 331 moves through and is guided by the pocket formed by resilient finger 325 and rigid finger 323 immediately to the left thereof. In this manner, the five spears 331 are placed against the inner wall of jar 44 in the spaces between the other five spears 330.

After the second down-stroke of pusher means 40 in a sequence, jar 44 is lowered and moved out from under guide means 300. At this point the ten spears 330 and 331 form a single layer against the interior wall or jar 44. The core portion of jar 44 is then filled with spears inserted in random fashion, either manually or by automatic or semi-automatic means (not shown).

In view of the disclosure of my aforesaid U.S. Pat. No. 3,468,098 and the present state-of-the-art, the sequential controller and its associated switches for automatic control of the apparatus previously described herein is not shown or described.

Although there have been described preferred embodiments of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows.

1. Apparatus for slicing elongated articles longitudinally into spears having segmental cross sections and inserting these spears lengthwise into a transparent container with cut edges of these spears lying against the container side wall; said apparatus including a hopper having an open upper end to receive an elongated article having its axis generally vertical, knife means including upwardly facing cutting means at the bottom of said hopper, first means, operating means for moving said first means from an inactive position withdrawn from said hopper downwardly into said hopper to drive an article therein through said knife means, second means positioned below said knife means to receive spears formed thereby and guide each of such spears through independent limited controlled angular movement, third means for positioning an elongated transparent container with its open end below said second means to receive spears issuing therefrom, guide means extending into a container supported by said third means in a spear receiving position below said second means, said guide means being operatively constructed to direct spears entering a container supported by said third means toward the side wall of such container, driving means for moving at least a section of said guide means and a container supported by said third means through a controlled angular step occurring between first and second successive operations of said operating means to said active position, whereby spears formed by the second operation of said operating means to said active position are directed to occupy spaces formed between adjacent spears formed during the first operation of said operating means to said active position.

2. Apparatus as set forth in claim 1, in which the guide means includes a guide portion operable between expanded and collapsed positions, said guide portion when expanded directing spears toward the side wall of a container supported by said third means and when in collapsed position directing spears to the central region of such containers.

3. Apparatus as set forth in claim 2, in which the guide portion is constructed of sheet material having an outwardly and downwardly flaring section.

4. Apparatus as set forth in claim 3, in which there is a collapsible mechanical support for operating the sheet material from the collapsed position to the expanded position of the guide portion.

5. Apparatus as set forth in claim 4, in which the flaring section is generally conical.

6. Apparatus as set forth in claim 5, in which the second means comprises a plurality of vertically extending elongated chutes each having a twist therein, said knife means including a plurality of radially extending blade sections and each of said chutes being of generally segmental cross section with the twist therein being substantially less than 180°, said angular step being equal to approximately 180° divided by the number of said chutes.

7. Apparatus as set forth in claim 3, in which the sheet material defines a bladder, fluid means for expanding said bladder to operate said guide portion to said expanded position.

8. Apparatus as set forth in claim 5, in which the sheet material defines a bladder, fluid means for expanding said bladder to operate said guide portion to said expanded position.

9. Apparatus as set forth in claim 7, in which the second means comprises a plurality of vertically extending elongated chutes each having a twist therein, said knife means including a plurality of radially extending blade sections and each of said chutes being of generally segmental cross section with the twist therein being substantially less than 180°, said angular step being equal to approximately 180° divided by the number of said chutes.

10. Apparatus as set forth in claim 2, in which there is a biasing means which operates to urge the guide portion toward its extended position; said biasing means positioned to permit partial collapse of said guide portion by segmental spears being forced by the first means into a jar supported by the third means.

*11. Apparatus as set forth in claim 1 in which the guide means includes a stationary section and a movable section, said movable section being that section previously recited as being angularly stepped by said driving means, said movable section including a plurality of vertically extending circularly arranged fingers spaced to form pockets therebetween, said pockets being equal in number to twice the number of spears formed by a single operation of said operating means to said active position.*

*12. Apparatus as set forth in claim 11 in which alternate ones of said fingers are rigid and the remainder of said fingers are flexible, said stationary section having formations to control deflection of said flexible fingers when said movable section is stepped by said driving means so that spears are directed to alternate ones of said pockets upon said first operation of said operating means and to the remaining ones of said pockets upon said second operation of said operating means.*

*13. Apparatus as set forth in claim 12, in which the second means comprises a plurality of vertically extending elongated chutes each having a twist therein, said knife means including a plurality of radially extending blade sections and each of said chutes being of generally segmental cross-section with the twist therein being substantially less than 180 degrees, said angular step being equal to approximately 180 degrees divided by the number of said chutes.*

*14. Apparatus as set forth in claim 12 in which said flexible fingers are substantially longer than said rigid fingers and the upper ends of the former extend substantially above the upper ends of the latter.*

References Cited

The following references, cited by the Examiner, are of record in the patented file of this patent or the original patent.

UNITED STATES PATENTS

| | | | |
|---|---|---|---|
| 3,461,646 | 8/1969 | Lane et al. | 53—123 |
| 3,468,098 | 9/1969 | Eisenberg | 53—123 |

TRAVIS S. McGEHEE, Primary Examiner

U.S. Cl. X.R.

53—263